United States Patent Office 3,162,036
Patented Dec. 22, 1964

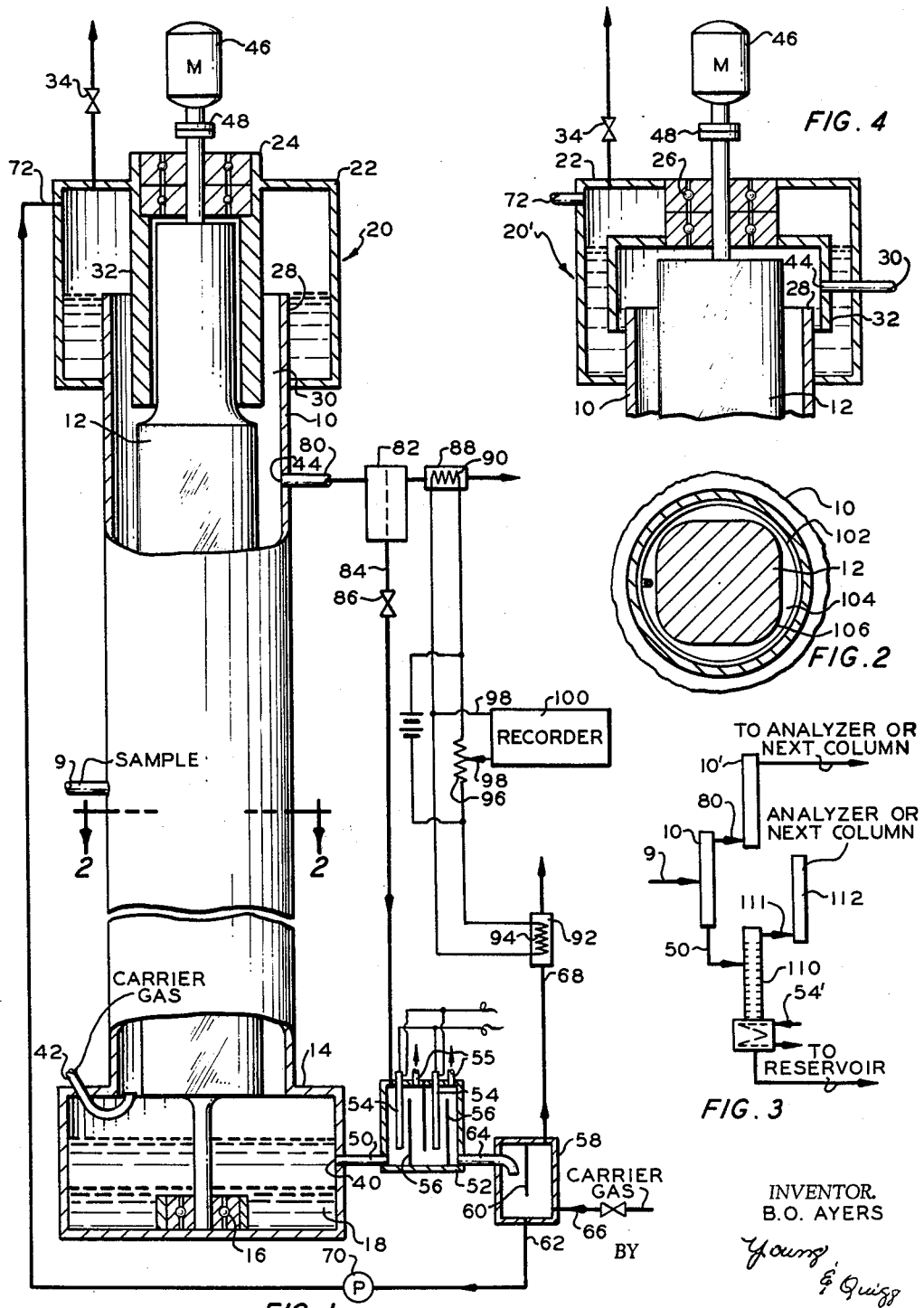

3,162,036
SPINNING BAND CHROMATOGRAPHIC COLUMN WITH FALLING FILM
Buell O. Ayers, Bartlesville, Okla., assignor to Phillips Petroleum Company, a corporation of Delaware
Filed May 21, 1962, Ser. No. 196,422
18 Claims. (Cl. 73—23.1)

This invention relates to an improved chromatographic analyzer, and specifically to such an analyzer which permits of continuous chromatographic separation and hence continuous chromatographic analyses. In one specific aspect the invention relates to a wetted wall column having a rotor therein which rotates gases through a helical path upwardly through said column and in countercurrent flow with respect to a film oozing down and wetting the column wall. The film comprises an appropriate sorbent.

It is known to perform analyses of mixtures of gases by separating them through the technique of elution chromatography. In this technique, a sample of the material that is to be analyzed is introduced into the column which contains a sorbent. The sorbent retains the material in a selective manner and the various constituents of the material, which is ordinarily a mixture of gases, are individually desorbed by passing a carrier gas through the column. The desorption takes place at varying rates, and the result is that each constituent tends to elute from the sorbent at a different time than do the other constituents. The column effluent thus consists initially of the carrier gas, the individual constituents of the fluid mixture appearing at later spaced time intervals. It is common practice to detect these constituents by means of a thermal conductivity analyzer which compares the thermal conductivity of the effluent gas with the thermal conductivity of the carrier gas introduced into the column. This particular technique ordinarily requires a long column in order to effect the desired separation and it also ordinarily requires a batch or intermittent (sampling) type of operation.

This is a continuation-in-part of my copending application Serial No. 787,224 filed January 16, 1959, now abandoned.

The instant invention provides a means for continuously chromatographically separating a fluid mixture and for continuously analyzing the effluent from the column. In one specific embodiment it comprises a vertically disposed cylindrical column having a rotor mounted therein. The sorbent, in the form of a liquid, is admitted to the top of the column and is flowed by gravity down the column and in countercurrent flow with respect to the fluid mixture or sample that is flowing up the column. The rotor rotates the sample fluid, thus causing it to flow in a helical path and exposing it for a maximum length of time and path to the sorbent. In addition, a means for withdrawing the liquid from the bottom of the column, desorbing gases therefrom, and recirculating it to the top of the column are provided. The advantages realized by the instant apparatus are that a shorter column can be employed because the effect of the rotation of the gases as they pass through the column is to increase the length thereof. Moreover, by providing an appropriate recirculating means, it is possible to bring about a continuous chromatographic separation and therefore to effect a continuous chromatographic analysis. Of course, if desired, the instant invention can be applied in series flow relationship with respect to like or other chromatographic columns in order to bring about desired separations and therefore permit a specific analysis.

In the drawings:
FIGURE 1 illustrates one embodiment of the invention;
FIGURE 2 illustrates a detail through section 2—2 of FIGURE 1;
FIGURE 3 illustrates a system that includes the column as illustrated in FIGURE 1; and
FIGURE 4 illustrates a modification of FIGURE 1.

In the drawings, like numbers represent like elements throughout.

In FIGURE 1, a column 10 comprising a member with a vertically disposed cylinder has a rotor 12 disposed coaxially with the axis of the cylinder. At the bottom of the column 10 is an enlarged chamber 14 disposed beneath such cylindrical chamber, preferably coaxial therewith and in unrestricted communication therewith. Suitable bearings such as the sealed ball bearing 16 are provided at the bottom of the enlarged chamber 14 to rotatably support the rotor. At the bottom of the enlarged chamber is disposed a mercury seal, i.e., a body of mercury, 18.

At the upper end of the member 10 is disposed a weir assembly 20 which is a portion of the recirculation system and, specifically, comprises a means for admitting around the cylinder walls a film of sorbent. This assembly comprises a tank 22, a pillow block 24 supported therein, and a plurality of sealed roller bearings 26 for rotatably supporting the rotor with respect to the column. A vertical extension of the column defines a weir 28 which communicates with an annular passage 30 formed by the column and a circular member 32 of lesser radius than horizontal surface. The member 32 depends below and is concentric with the weir 28, the annulus defined by their radial difference providing a means for defining the thickness of the layer of liquid maintained on the walls of the cylinder. The annulus 30 also inherently operates as a means for circumferentially distributing the liquid around the wall. A vent valve 34, which may be manually, pressure- or timer-operated, completes the weir assembly.

Other features of the column include a first opening 40 through which liquid rich with sorbed gases (hereinafter rich liquid) may be withdrawn, a second opening 42 through which carrier gas is admitted, a third opening 44 through which a sample stream may be continuously withdrawn and directed to an analyzing means and opening 9 for introduction of the sample stream to the column. The system also includes a means for rotating the rotor 12, such as an electric motor 46 which is connected to the rotor by a coupling 48. A gear transmission or the like may be provided to adjust the rotor speed. The motor 46 is preferably a synchronous motor which operates at constant speed, and therefore maintains constant conditions in the column during operation.

A sorbent circulation system is also associated with the foregoing and is considered an essential portion thereof inasmuch as it permits continuous operation by continuously withdrawing liquid from the opening 40 and, after processing it, delivering it to the weir assembly 20. Such a system includes the conduit 50 in communication with the opening 40. Liquid removed through 50 is directed into a desorber 52 where it is heated, as by electrical resistance heaters 54, to drive the gases out of the liquid. The gas exits through vents 55. A series of baffles 56 define the flow path of the liquid through the desorber. Next is provided a reservoir 58 having therein a baffle 60, an outlet 62, and a liquid inlet conduit 64 for delivering liquid from the desorber. The reservoir also includes a carrier gas inlet line 66 which comprises means for contacting the liquid in the reservoir with a carrier gas. A means for moving the vapors thus formed (carrier gas plus vapors from the liquid) from the reservoir to analyzing apparatus is presented by the vent line 68.

A metering pump 70 removes the liquid from the reservoir and pumps it through a conduit 72 to thereby deliver it to the weir assembly 20. If necessitated by the viscosity of the liquid, it may be necessary to provide a pump in the line 50 and the operate the desorber under pressure instead of letting the gases therefrom boil off to the atmosphere. The metering pump 70 may be such as shown in United States Patent 2,840,004.

The means for analyzing the eluted gas (gases) from the sample stream comprises a conduit 80 in communication with the opening 44 which delivers the gases to a knock-out drum and liquid trap 82. The trap 82 may include a liquid removal line 84 and a valve 86 to direct liquid collected therein to the desorber 52. The valve 86 may be manually or liquid level operated (from the liquid level in the knock-out drum). This apparatus is normally quite small, a glass knock-out drum being desirable for liquid level observation. The gases are delivered from the knock-out drum to an analyzing cell 88 which has therein a resistance element such as a thermistor 90. In similar fashion the vent gases from the reservoir are directed through line 68 to a reference cell 92 having therein a similar resistance element 94. The two resistance elements cooperate with a potentiometer 96 to form a Wheatstone bridge. The output leads 98 connect the bridge to a recorder 100.

FIGURE 2 illustrates the relationship between the rotor size and the cylinder in which it is disposed. As shown, sufficient clearance is provided between the rotor to permit formation of a film of liquid 102 within the column. There is also sufficient clearance to provide a gas flow space 104.

The rotor 12 is preferably of a cross-sectional configuration of a square with rounded corners. If desired the rounded corners such as 106 can have a roughened surface in order to increase the drag exercised on the gas passing between there and the liquid 102. As should be evident from FIGURES 1, 2 and 4 (hereinafter discussed) it is necessary to maintain the wall of the column wetted between the gas inlet 42 and the gas outlet 44. Also, the liquid travels countercurrent with respect to the gas and flows by gravity from its inlet at 30 down to the point where it is collected in the enlarged portion of the column.

The apparatus of FIGURE 1 is designed to provide the weir assembly 20 so that the liquid film 102 can be formed by the cooperation of the telescoped assembly of 32 within the upper edge of the column 10. The lower end of the column is enlarged so that there will be no pumping of the sorbent up the radial clearance between the rotor and the column. The mercury seal 18 and the head of liquid within the weir assembly provide means for preventing the escape of gas from within the column.

In FIGURE 3 is shown a system that incorporates the chromatographic column of the instant invention. Liquid is withdrawn from the column through conduit 50 and delivered to an intermediate portion of a fractionator 110. The factionator may either comprise a plurality of trays or be a packed column. Heat is applied either through a small steam coil 54' or from an electrical resistance heater such as 54 (FIGURE 1). The liquid product can be withdrawn from the fractionator and delivered to a reservoir as is shown in FIGURE 1. The fractionator has an overhead products line 111 which can introduce the gas collected therein to either an analyzer or to a subsequent column for further separation. A continuous stream of eluted gas is transmitted from the upper region of the column 10 through line 80 to a second column 10' in series therewith.

The apparatus of FIGURE 3 is especially useful when the sorbent (a) sorbs a constituent for which it is desired to analyze, and/or (b) sorbs a mixture of gases that include the one gas that is desired to analyze or is obtained in the line 80. Of course, it should be realized that if either of these conditions is obtained that only a portion of the system shown in FIGURE 3 need be employed to effect the separation desired. It should be noted that the apparatus 112 in this figure may comprise either a subsequent column (such as 10) for further separating gases flowing through the overhead conduit 111 or mean for analyzing gases in 111.

The apparatus shown in FIGURE 4 may be used in modifying the system of FIGURE 1. In FIGURE 4 the means for admitting and distributing the liquid sorbent to the column is disposed below the gas outlet 44, whereas in FIGURE 1 such means is disposed above the outlet. It should be noted that a concentric annular member 32' surrounds as well as depends below the uppermost horizontal surface 28 of the member 10. Also, the rotor 12 may be of uniform cross section through most of the length thereof that is enclosed in member 10.

A sorbent suitable for use in such column may comprise dimethylsulfolane or a commercially obtainable fluid such as Dow-Corning Silicon 200. Air or helium may comprise the carrier gas. The sample fed in through conduit 42 may comprise a mixture of hydrocarbons.

The sample should be continuously added at the side of the column (either pure sample or sample diluted with carrier gas). The point of sample addition should be midway between the take-off point at the top of the column and the liquid take-off point at the bottom of the column. Carrier gas should also be added at the bottom of the column.

The column length and flow rates are based on the following calculations:

$N$ = total number of theoretical plates in the column $R$ = number of theoretical plates between point of sample injection and top take-off point. The system functions best when $N = 2R$.

$M_1$ = mass/unit time of component 1 added to column $M_2$ = mass/unit time of component 2 added to column $V = \dfrac{M_1}{M_2}$ = ratio of sample components $\beta_1, \beta_2$ = mass/unit time of components 1 and 2 taken off at bottom of column $\gamma_1, \gamma_2$ = mass/unit time of components 1 and 2 taken off top of column $K_1, K_2$ = partition coefficients of sample components 1 and 2 in the liquid phase employed $\alpha = \dfrac{K_2}{K_1}$ $U = \dfrac{\beta_2}{\beta_1}$ = ratio of components at bottom take-off point $T = \dfrac{\gamma_1}{\gamma_2}$ = ratio of components at top take-off point U and T are measures of the cross contamination of the products at take-off points.

$r = Fe$, were $Fe$ and $Fg$ are the flow rates of the liqui phase $Fg$ and the gas phase For any sample component, $i$, on a falling film column, the following equation can be derived:

$$\frac{\beta_i}{\gamma_i} = \frac{(K_i r)^{N+2} - (K_i r)^{N-R+1}}{(K_i r)^{N-R+1} - 1}$$

which for $N = 2R$ becomes $$\frac{\beta_i}{\gamma_i} = (K_i r)^{R+1}$$

For a system of two components, 1 and 2, where $K_2 > K_1$ $$\frac{\beta_2 \gamma_1}{\gamma_2 \beta_1} = \frac{(K_2 r)^{R+1}}{(K_1 r)^{R+1}} = \alpha^{R+1} \text{ where } \alpha = \frac{K_2}{K_1}$$

The number of plates $N=2R$, required to perform the separation depends on the values of $$U=\frac{\beta_2}{\beta_1} \text{ and } T=\frac{\gamma_1}{\gamma_2}$$

required and the ratio of the components in the sample $$V=\frac{M_1}{M_2}$$

For a symmetrical column (sample addition point midway between take-off points), let:

$$\frac{\beta_2}{\gamma_2}=\frac{\gamma_1}{\beta_1}=\alpha^{(R+1)/2}=\psi^{1/2}$$

$$\beta_1+\gamma_1=M_1=VM_2-V(\beta_2+\gamma_2)$$

$$\beta_1+\beta_1\psi^{1/2}=V(\gamma_2\psi^{1/2}+\gamma_2)$$

$$\beta_1=V\gamma_2$$

$$\frac{\gamma_1}{V\gamma_2}=\psi^{1/2}=\frac{T}{V}$$

$$\frac{\beta_2 V}{\beta_1}=1/2=UV$$

$$T=V\psi^{1/2}$$

$$U=\frac{1}{V}\psi^{1/2}$$

Whichever of T or U is smallest (for fixed $\psi^{1/2}$) is determined by the value of V. The smaller of T or U is set equal to the acceptable value of cross contamination $$\left(\text{for example } U=\frac{\beta_1}{\beta_2}=1000\right)$$

and the value of R is computed from $$\psi^{1/2}=UV \text{ or } \frac{T}{V}$$

and $$R=\frac{\text{Log }\psi}{\text{Log }\alpha}-1$$

$$N=2\left(\frac{\text{Log }\psi}{\text{Log }\alpha}-1\right)$$

From a knowledge of the plate height obtained with the column, the length of the column is given by $L=NH$ and the distance from the top take-off point to the point of sample injection is $L/2$. The ratio of the liquid flow rate to gas flow rate $$r=\frac{Fe}{Fg}$$

can be computed from $$\frac{\text{Log }\psi}{2(R+1)}=\log K_2 r$$

Then either $Fe$ or $Fg$ is left to be arbitrarily adjusted.

*Example*

$K_2=36$ $$\alpha=1.2=\frac{K_2}{K_1}$$

$$V=\frac{M_1}{M_2}=100$$

The smallest value of U or T is 1000.

$T=10^2\psi^{1/2}$ $U=10^{-2}\psi^{1/2}$ $U=10^3$ (obviously gives higher value of $\psi$ than $T=10^3$)

$\psi^{1/2}=10^5$ $\psi=10^{10}$ $$R=\frac{10}{\log \alpha}-1=126$$

$N=2R=252$ plates

If $H=0.6$ cm.

$L=252\times0.6=151$ cm.$=4.97$ ft.

$$\frac{L}{2}=2.49 \text{ ft.}$$

$$\text{Log }r=\frac{\log \psi}{2(R+1)}-\log K_2$$

$r=0.0304$

If $Fg=50$ cm.$^3$/min.

$Fe=1.52$ cm.$^3$/min.

Under these conditions $\frac{\beta_2}{\beta_1}=1000$; $\frac{\gamma_1}{\gamma_2}=10^7$ The symmetrical column will still give adequate separation if the ratio of the sample components is inverted and for every case in between these two limits.

For a spinning band column with liquid phase fixed in place on the walls, the velocity at which the $i$th component moves through the column is given by $$Vi=\frac{C}{C+Ci}Vg \tag{1}$$

where $Vi=$linear velocity of average molecule of $i$th component relative to a fixed point in the liquid film
$Vg=$average linear velocity of carrier gas
$Ci=$capacity of the liquid phase for $i$th component per unit length
$C=$capacity of gas phase per unit length.

With a falling film of partitioning agent flowing counter to the gas flow, the velocity equation relative to a point fixed in the column becomes $$Vi=\frac{C}{C+Ci}Vg-\frac{Ci}{C+Ci}Ve \tag{2}$$

where $Ve$ is the linear velocity of the falling film.

Thus when, for the $i$th component, $$Ve=\frac{C}{Ci}Vg \tag{3}$$

the component will not move through the column since this condition makes $Vi$ equal to zero. Any value of $Ve$ smaller than $$\frac{C}{Ci}Vg$$

will permit the $i$th component to move through the column at a slower rate; the ratio of the velocities in the column with falling films to the column with fixed film being determined by the ratio of Equation 2 to Equation 1. During passage of the gases through the "falling-film" column they are contacted with a larger quantity of liquid phase. This is equivalent to lengthening the column by the ratio $$\frac{L'\text{eff.}}{L}=1+Ve\left(\frac{C+Ci}{CVg-CiVe}\right) \tag{4}$$

where $L'$eff. is the effective length of the "falling-film" column and L is the length of the same column with a fixed liquid film.

If the volume of liquid phase per unit length of column is $q$, then the quantity flowing past a fixed point on the column will be $qVe$. For the "fixed-film" column, the total volume of liquid contacted will be $qL$ and the "falling-film" column $qL+qVeti$. This is equivalent to increasing the length of the column by the ratio $$\frac{L'\text{eff.}}{L}=1+\frac{Veti}{L}+\frac{Ve}{Vi}$$

and substituting from Equation 2 gives Equation 4.

The peak separation, $S$, is proportional to column length $$S = K'L \quad (5)$$

and peak width, $\Delta t$, is proportional to the square root of column length $$\Delta t_2 = K''L^{1/2} \quad (6)$$

Resolution is then equal to $$R = \frac{S}{\Delta t_2} = K'''L^{1/2} \quad (7)$$

The "falling-film" column thus improves the resolution for a "spinning-band" column of a given physical length by the ratio $$\frac{R^1}{R} = \left(\frac{L'\text{eff.}}{K}\right)^{1/2} = \left(1 + Ve\left(\frac{C + \overline{C}i}{CVg - \overline{C}iVe}\right)\right)^{1/2} \quad (8)$$

where $\overline{C}i$ is the average capacity of the liquid phase for the two components for which the resolution is to be calculated.

*Example*

Separation of n-hexane from n-heptane with a 2-foot (60 cm.) column for which $C_1$ (n-hexane) equals 4, $C_2$ (n-heptane) equals 5. Carrier gas velocity $Vg$ equals 100 cm./min., liquid phase velocity $Ve$ equals 10 cm./min.

(With "Fixed-liquid" Phase.)

$$V_1 = \frac{1}{5}Vg = \frac{1}{5} \times 100 = 20 \text{ cm./min.}$$

$$t_1 = \frac{60}{20} = 3 \text{ min.}$$

$$V_2 = \frac{1}{6}Vg = \frac{1}{6} \times 100 = 16.6 \text{ cm./min.}$$

$$t_2 = \frac{60}{16.6} = 3.6 \text{ min.}$$

$$St = t_2 - t_1 = .6 \text{ min.} = 36 \text{ sec.}$$

(With "falling-film" column.)

$$V_1' = 20 - \frac{4}{5}(10) = 20 - 8 = 12 \text{ cm./min.}$$

$$t_1' = \frac{60}{12} = 5 \text{ min.}$$

$$V_2' = 16.6 \text{ cm.} - \frac{5}{6}(10) = 16.6 - 8.3 = 8.3/\text{min.}$$

$$t_2' = \frac{60}{8.3} = 7.2 \text{ min.}$$

$$St' = 7.2 - 5 = 2.2 \text{ min.} = 132 \text{ sec.}$$

And according to Equation 8, the resolution has been improved by the ratio $$\frac{R'}{R} = \left(1 + 10\frac{(1 + 4.5)}{(100 - 4.5(10))}\right)^{1/2} = (2)^{1/2} = 1.414.$$

From the above it is seen that introducing the falling film has effectively doubled the length of the column.

As an illustration of the continuous separation of n-$C_6$ and n-$C_7$ on a spinning-band column with falling-film; let $$Ve = \frac{C}{\overline{C}i}Vg = \frac{1}{4.5} \times 100 = 22.2 \text{ cm./min.}$$

then $$Vi = 20 - \frac{4}{5}(22.5) = 20 - 18 = 2 \text{ cm./min.}$$

$$V_2' = 16.6 - \frac{5}{6}(22.5) = 16.6 - 18.8 = -2.2 \text{ cm./min.}$$

It should be evident to those skilled in the art that various modifications and changes are applicable to the instant system. For example, the rotor 12 could be of other shapes than that shown in FIGURE 2. Therefore, it is not my intention to limit myself only to that embodiment as shown in the drawings but to include as my invention all the equivalents thereto and modifications thereof which will be obvious to one skilled in the art.

I claim:

1. In a combination of apparatus for performing chromatographic analyses, an improved means for separating that comprises a column; a rotor disposed within and extending substantially the length of said column; means to actuate said rotor; means for analyzing a fluid drawn from said column; first conduit means connected to said column for removing a fluid from an upper region of said column and for transporting such fluid to said means for analyzing; second conduit means connected to said column for removing another fluid from a lower region of said column; means in communication with said second conduit means for circulating a liquid derived from said another fluid to the first-said region of said column; and third conduit means connected to said column between said upper and lower regions to introduce a sample into said column.

2. A continuous chromatographic analyzer comprising a column having therein a cylindrical chamber with the axis vertically disposed; a rotor extending through and supported within the chamber for rotation relative to said column; means to actuate said rotor; means for analyzing a fluid drawn from said column; first conduit means connected to said column for removing a fluid from an upper region of said column and for transporting such fluid to said means for analyzing; second conduit means connected to said column for removing another fluid from a lower region of said column; means in communication with said second conduit means for circulating a liquid derived from said another fluid to the first-said region of said column; and third conduit means connected to said column between said upper and lower regions to introduce a sample into said column.

3. A continuous chromatographic analyzer according to claim 2 wherein said means for circulating includes a conduit connected to a region of said column above the connection thereto of said first conduit means.

4. A continuous chromatographic analyzer according to claim 2 wherein said first conduit means is connected to an upper region of said column, wherein said second conduit means is connected to a region within said column that is below the connection of said first conduit means, and wherein said means for circulating includes a means for delivering said liquid to a region of said column intermediate the connections thereto of said first and second conduit means.

5. A continuous chromatographic analyzer comprising a member having therein a cylindrical chamber with the axis of such chamber vertically disposed; a rotor disposed within and extending the length of said chamber and coaxial therewith; means for supporting said rotor for rotation within said cylindrical chamber relative to said member, the minimum radial clearance between said rotor and said cylindrical chamber being sufficient to provide radial clearances for (a) a falling film of liquid on the wall and (b) a film of gas between said falling film and said rotor; means for continuously admitting a sample stream of gas to said cylindrical chamber; means, connected into said cylindrical chamber in an upper region, for continuously withdrawing a stream derived from said sample stream; means, connected into said cylindrical chamber in a lower region, for continuously withdrawing from said chamber a stream comprising essentially a liquid; means connected into said chamber above the first means to withdraw for admitting and distributing a stream comprising essentially such liquid about the cylindrical surface of said chambers; means for continuously circulating a stream comprising essentially such liquid from the lower region having any constituents from said sample stream previously removed therefrom to the upper region; and means in communication with the upper withdrawing means for analyzing the stream withdrawn from the column.

6. A continuous chromatographic analyzer comprising a member having therein a cylindrical chamber with the axis of such chamber vetrically disposed; a rotor disposed within said chamber and extending coaxial therewith; means to actuate said rotor; means for supporting said rotor for rotation within said cylindrical chamber relative to said member, said rotor being of less radius than said chamber to thereby provide a clearance; a means for analyzing; means for continuously admitting a sample stream into said chamber; means for continuously withdrawing another stream from the top of said chamber and for directing same to said means for analyzing; and means for maintaining the cylindrical chamber walls coated with a layer of liquid of less thickness than said clearance by continuously withdrawing liquid from said chamber and returning liquid after being so withdrawn to said chamber.

7. A continuous chromatographic analyzer according to claim 6 wherein said means for maintaining cylindrical chamber walls coated comprises a means for admitting and distributing liquid, disposed above the means for continuously withdrawing another stream.

8. A continuous chromatographic analyzer according to claim 6 wherein said means for maintaining cylindrical chamber walls coated comprises a means for admitting and distributing liquid, disposed below the means for continuously withdrawing another stream.

9. A continuous chromatographic analyzer according to claim 6 wherein said means for maintaining comprises a weir comprising the uppermost circular horizontal surface of said member and a circular member that depends below and is concentric with said surface, the radial difference therebetween providing a means for defining the thickness of the layer of liquid.

10. A continuous chromatographic analyzer according to claim 6 wherein said member contains an enlarged chamber disposed beneath said cylindrical chamber and in unrestricted communication therewith.

11. An analyzer according to claim 10 further including a body of mercury within said enlarged chamber.

12. A continuous chromatographic analyzer according to claim 6 wherein said means for maintaining comprises a desorber and a reservoir connected in series, conduit means for connecting said desorber with the bottom of said chamber, and a means for withdrawing liquid from said reservoir and transporting it to the uppermost portion of said chamber that is coated with liquid.

13. A continuous chromatographic analyzer according to claim 6 wherein said rotor comprises a member having the cross-sectional configuration of a square with rounded corners.

14. A chromatographic analyzer according to claim 13 wherein said rotor has roughened surfaces at the rounded corners.

15. A continuous chromatographic analyzer for removing certain constituents from a continuous gaseous sample stream by passing such stream countercurrently to a liquid sorbent in a wetted-wall column to thereby sorb such constituents in such sorbent from such column, and wherein such sorbent is continuously withdrawn from such column, the sorbed constituents desorbed therefrom, and then the liquid recirculated to the column, such analyzer comprising a member having therein a cylindrical chamber with the axis of such chamber vertically disposed and with first, second, third and fourth openings arranged in that order from the bottom to the top of said chamber; a rotor coaxially disposed and rotatably supported within said chamber; means for continuously analyzing a gaseous stream withdrawn from one of said third and fourth openings; means for withdrawing a liquid from said chamber through said first opening and subsequently directing the liquid to the other of said third and fourth openings after having removed any sorbed constituents of said sample stream therefrom; and conduit means for flowing a sample stream into said chamber through said second opening; that portion of said chamber between said first opening and the other of said third and fourth openings defining the wetted-wall column.

16. A continuous chromatographic analyzer according to claim 15 wherein said means for withdrawing and directing includes a reservoir for the liquid, said reservoir including means for contacting liquid therein with a carrier gas and means for removing vapors from said reservoir after such contacting.

17. A continuous chromatographic analyzer according to claim 16 wherein said means for continuously analyzing comprises an analyzer cell through which is directed said gaseous stream from said one of said third and fourth openings after having removed any sorbed constituents of said sample stream therefrom, a reference cell connected to said means for removing vapors from said reservoir, and means for comparing the responses of said respective cells to the respective streams directed therethrough.

18. A continuous chromatographic analyzer according to claim 15 wherein said means for withdrawing and directing are respectively connected to a fractionator having an overhead products line, a second means for analyzing, means for feeding liquid withdrawn from said chamber to said fractionator, means for feeding the liquid bottoms product to said reservoir, and means for connecting the overhead products line to said second means for analyzing.

References Cited in the file of this patent
UNITED STATES PATENTS

| | | |
|---|---|---|
| 2,394,293 | Deem | Feb. 5, 1946 |
| 2,869,672 | Findlay | Jan. 20, 1959 |
| 3,038,326 | Ford | June 12, 1962 |